United States Patent

Suur-Askola et al.

[11] Patent Number: 5,896,948
[45] Date of Patent: *Apr. 27, 1999

[54] RESERVE POWER SYSTEM

[75] Inventors: Seppo Suur-Askola; Timo Lehtonen, both of Riihimäki; Ralf Ekholm, Helsinki, all of Finland

[73] Assignee: Kone Oy, Helsinki, Finland

[*] Notice: This patent is subject to a terminal disclaimer.

[21] Appl. No.: 08/836,988

[22] PCT Filed: Nov. 22, 1995

[86] PCT No.: PCT/FI95/00646

§ 371 Date: Jul. 24, 1997

§ 102(e) Date: Jul. 24, 1997

[87] PCT Pub. No.: WO96/16892

PCT Pub. Date: Jun. 6, 1996

[30] Foreign Application Priority Data

Nov. 29, 1994 [FI] Finland ................................ FI 945639

[51] Int. Cl.⁶ ...................................................... B66B 1/06
[52] U.S. Cl. ............................................. 187/290; 187/391
[58] Field of Search ..................................... 187/290, 391, 187/393

[56] References Cited

U.S. PATENT DOCUMENTS

| | | | |
|---|---|---|---|
| 3,506,095 | 4/1970 | Weaver | 187/290 |
| 4,399,892 | 8/1983 | Watanabe | 187/290 |
| 4,640,389 | 2/1987 | Kamaike | 187/119 |
| 5,229,558 | 7/1993 | Hakala | 187/118 |

FOREIGN PATENT DOCUMENTS

| | | | |
|---|---|---|---|
| 53-32547 | 3/1978 | Japan | 187/290 |
| 3-158369 | 7/1991 | Japan | 187/290 |

*Primary Examiner*—Robert E. Nappi

[57] ABSTRACT

A reserve power system includes a reserve power machine (2) for the generation of power. The reserve power machine (2) is connected via a distribution network (4) to consumers (10,12) and elevator drives (8). The elevator drives include an elevator hoisting motor (28) and a frequency converter (26) controlling it. The elevator drives are provided with regulating devices (26, 44, 46) by means of which the speed of the elevator motor (28) is so adjusted that the power taken by the elevator drive (8) from the distribution network (4) is lower than an adjustable power limit ($P_A$).

9 Claims, 4 Drawing Sheets

RESERVE POWER SYSTEM

BACKGROUND OF THE INVENTION

The present invention relates to a reserve power system comprising a reserve power machine for the generation of power, consumers, several elevator drives consisting of an elevator hoisting motor and a frequency converter controlling it, and a distribution network connecting the reserve power machine, consumers and elevator drives.

When elevator service in the event of a power failure is to be ensured, business premises, hotels, hospitals and high-rise residential blocks are usually provided with an elevator system in which a separate control centre, often implemented with relays for simplicity, assigns operating turns to different elevators at least within an elevator bank and often to all elevators in the building. The elevators are allowed to start out by turns, generally towards the ground floor. The next elevator is given permission to depart either after the previous one has reported arrival at destination or after the lapse of a fixed length of time from the departure of the previous elevator. In the latter case, however, care is taken to ensure that the reserve power available is not exceeded by accident. In most cases, the relays of the motor drives are cross-connected so that only one elevator is able to run at a time.

In addition to a so-called main group intended for personal transport, typical business premises also contain other elevators, such as freight elevators and parking elevators. The main group elevators carry most of the elevator traffic and load. A typical mid-range building also has several elevator banks for personal transport, e.g. one at each end of the building, and several freight and parking elevators. In this context, 'mid-range elevator' refers to elevator applications in buildings having about 10–20 floors. If a middle sized building has several elevator banks for personal traffic, a normal basis of design for a situation where elevator operation relies on reserve power is that one elevator in each bank for passenger traffic can remain in normal operation on reserve power after the rescue phase. In a building of this size, the stairs are still usable as an alternative to elevators in case of a power failure.

From the above-mentioned principle of designing the reserve power for only one elevator in each elevator bank, it follows that rescuing is very slow. A rule of thumb often applied is that at most 12 elevators are connected to the same reserve power system, from which it follows that in case of a power failure passengers have to wait for their turn to get out for a length of time ranging from a few minutes to a few tens of minutes.

In larger buildings with more than 20 floors, it is not sensible to design the reserve power on the basis of having only one elevator in each elevator bank operable with reserve power. Therefore, the reserve power capacity for such buildings has to be so designed that, relatively speaking, a larger number of elevators can be operated by reserve power. Although the reserve power centre must feed other equipment as well, elevators are generally the largest load in respect of both power and above all starting current, which in the case of elevators is a basis of design.

To achieve a good level of service, a large reserve power application is needed, resulting in fairly high costs for the building. It should be noted that a relatively large portion of the costs is associated with noise, smoke and oil leakage protection of the reserve power machines rather than electric generators. Therefore, the total costs are significant.

In market areas where power failures are very common, the reserve power system must be nearly perfect. This is because in a situation where reserve power is used, passengers behave in an unpredictable way and it often occurs that passengers do not evacuate the car according to instructions, with the result that the next elevators have to wait longer than they are assumed to. Instead of using a centralized reserve power system, elevators have been equipped with individual battery driven reserve power units that, to reduce the costs, are often used only to drive the elevator to the next floor, where the passengers are allowed to leave the car. This solution, too, is expensive because e.g. the door control system requires a separate supply consistent with the nominal mains voltage. Moreover, this arrangement involves high battery maintenance costs, among other things.

SUMMARY OF THE INVENTION

The object of the invention is to develop a new and advantageous energy supply and control system for an elevator which, in a reserve power situation, i.e. in a situation where normal electricity supply is for some reason interrupted, is capable of producing a considerably higher transport capacity than earlier systems. In a favourable traffic situation, the elevators can even be operated in a way corresponding to normal operation. To achieve this, the reserve power system of the invention is characterized in that at least one elevator drive is provided with control equipment that adjusts the speed of the elevator motor in such a way that the power taken by the elevator motor from the distribution network is lower than an adjustable power-limit.

According to a preferred embodiment of the invention, at least two elevators are combined into a group, the speeds of said elevators being so adjustable that the power taken by the group from the distribution network is lower than the adjustable power limit.

According to another embodiment of the invention, at least one elevator drive can be so controlled that it will produce power for supply to other elevator drives in the same group.

According to a third embodiment, at least one elevator drive can be so controlled that it will produce power for supply to other elevator drives and other consumers.

According to yet another embodiment, the power limit of each elevator drive can be adjusted separately.

According to a further embodiment, each elevator drive is provided with power monitoring devices used to determine the power requirement of the elevator in question and with power limit defining equipment used to define the power limit, on the basis of which the speed of the elevator is determined.

According to an additional feature of the invention, the elevator-specific power limits within an elevator group can be defined by the group controller.

According to another additional feature, the power limits can be determined by means of an elevator-specific parameter.

According to a third additional feature, the system comprises equipment used to determine the starting order of the elevator drives in accordance with the elevators' power generating capability.

With the solution of the invention, all energy available to the elevator drive and the building containing the elevator is optimally utilized in a reserve power situation.

In the solution of the invention, the motor drive in the elevator control system is able to decide its running speed by itself in accordance with conditions given. An advantageous condition mode is to use relative power. By virtue of the properties of a new type of frequency converter used, the elevator can be started with 12–25% of the nominal power even under the heaviest load conditions. However, this has the result that an empty elevator moves very slowly in the down direction. If there are passengers in the elevator car, the power required to drive downwards is reduced because the elevator is balanced to about 50% by the counterweight. In rescue operation, when the load is clearly over one half of the nominal load, mainly depending on the efficiency of the machinery, the elevator no longer needs power to move the car. However, motor magnetization and the control equipment require 10–20% of the nominal power.

For example, in the case of an elevator group comprising four elevators in which the reserve power capacity is designed on the principle typical of mid-range elevators as explained above, according to which the available energy is sufficient for one elevator in all operating situations, each one of the elevators can be guaranteed 25% of the nominal power by using the system of the invention. Depending on the load conditions, some or even all of the elevators can drive at full speed.

A significant advantage provided by the invention is a feeling of safety created in the passengers, which is achieved by the fact that the elevators start moving again immediately after a power failure after the lights have been turned on again. Alternatively, depending on market needs and the resources available, part of the advantage regarding quality of service can be translated into a saving in expenditure and the present level of service can be attained for a considerably lower price. This advantage can be achieved e.g. in high-rise residential buildings, which generally have two elevators, which means that the waiting time is no problem, and the advantage is created by the fact that the nominal power of the reserve power system can be lowered either to about one half without significantly reducing the level of service quality or to about one fourth of the present power level while still guranteeing rescue operation, though slow, with all elevators in all situations.

The invention provides a particularly great advantage in areas where power failures are very common. In this case, the solution of the invention allows almost normal or quasi normal elevator operation. Therefore, the abnormal situation does not necessarily require special instructions to be given, nor does it affect the behaviour of passengers. As compared with a purely battery operated solution, the invention allows savings to be made in the costs of establishment and maintenance of an energy storage. Further advantages are achieved in the supply of electricity to the control and peripheral apparatus.

Another field of application where the invention offers a particularly great benefit are fire situations in very high buildings. In such buildings, so-called gearless elevators are used which have such a high coefficient of efficiency that even with current technology it makes sense to supply energy back into the network e.g. when the elevator is driving downwards with full load or upwards with an empty car. At best, the electric power returned corresponds to 90% of the nominal power. For this purpose, the motor drives are provided with a so-called controlled mains bridge, which produces a current of correct frequency, form and voltage.

In a fire situation, the elevators can utilize the energy produced by other elevators via the internal network of the building, and thus all elevators can in this case drive practically at full speed all the time because in a rescue situation the cars generally travel down with full load and up with an almost empty car, one fireman being generally always present in the car in such situations. The power generated by the other elevators prevents the occurrence of overload on the reserve power system if the elevator machinery is temporarily put on heavy duty e.g. when the elevator is driving down with an empty car.

A further advantage in a fire situation is that, if the elevators can be run at full capacity during rescue work, they can even generate significant extra power for other equipment in. the building, such as normal lighting and pumps. Therefore, by using the solution of the invention, it will be beneficial to change the basic assumptions in the planning of rescue work and demand that full elevator service be available in high-rise buildings in the event of a fire and when rescue work relies on reserve power. This can be realized without significantly increasing the total costs. To attain the advantage, it is only required that the instantaneous power supplied to other equipment can be better controlled in a fire situation.

BRIEF DESCRIPTION OF THE DRAWINGS

In the following, the invention is described by the aid of a few examples of its embodiments by referring to the drawings, in which.

DETAILED DESCRIPTION OF THE INVENTION

Figure 1:
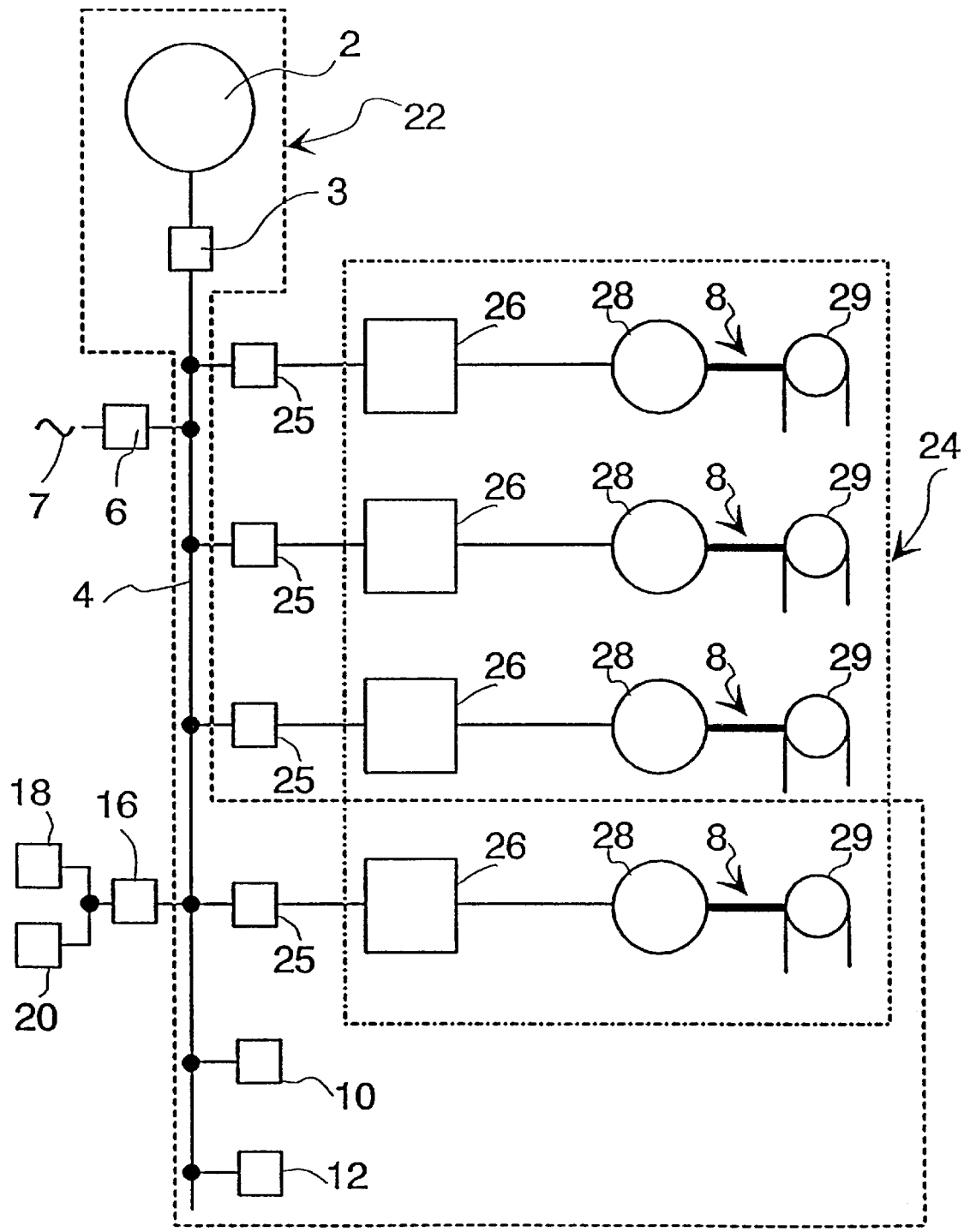
FIG. 1 presents a diagram representing the principle of a conventional reserve power solution.

In the conventional solution presented in FIG. 1, in a reserve power situation, a reserve power machine or generator 2 feeds via the power supply network 4 the power consuming equipment connected to the network. In the normal operating situation, the network 4 is connected via a switch 6 to an external electricity supply network 7. The power consuming devices include the elevators 8 of the building, which may be grouped into an elevator bank 24 operated under the same group control system. The elevator 8 is represented in the figure by the traction sheave 29, drive motor 28 and a regulator controlling the motor, such as a frequency converter 26. The elevator system is connected to the supply network via a switch 25. In practical applications, there are variations in the number of elevators, their arrangement in elevator groups and their control and peripheral apparatus. The power consuming devices include devices that have to be operable in emergencies, such as reserve lights 10 and fans 12. In addition, devices used in a normal situation, such as normal lights 18 and office and other machines 20, are connected to the network via a switch 16. In a conventional reserve power arrangement, the reserve power generator feeds devices selected in advance while other devices are turned off by means of the switches 16 and 25.

In the case of a system of a common design, this means e.g. that in each elevator group 24 one elevator 8 is in operation, reserve lights 10 are on and operating power is guaranteed for selected fans 12. Thus, the emergency operation system comprises an assembly consisting of these devices and the reserve power generator, marked in the figure with reference number 22. In this case, the reserve power generator 2 is so rated that the devices comprised in the emergency operation system 22 will receive the driving energy they need in all situations. A typical reserve power rating for a mid-range building is 50 . . . 150 kW.

Figure 2:
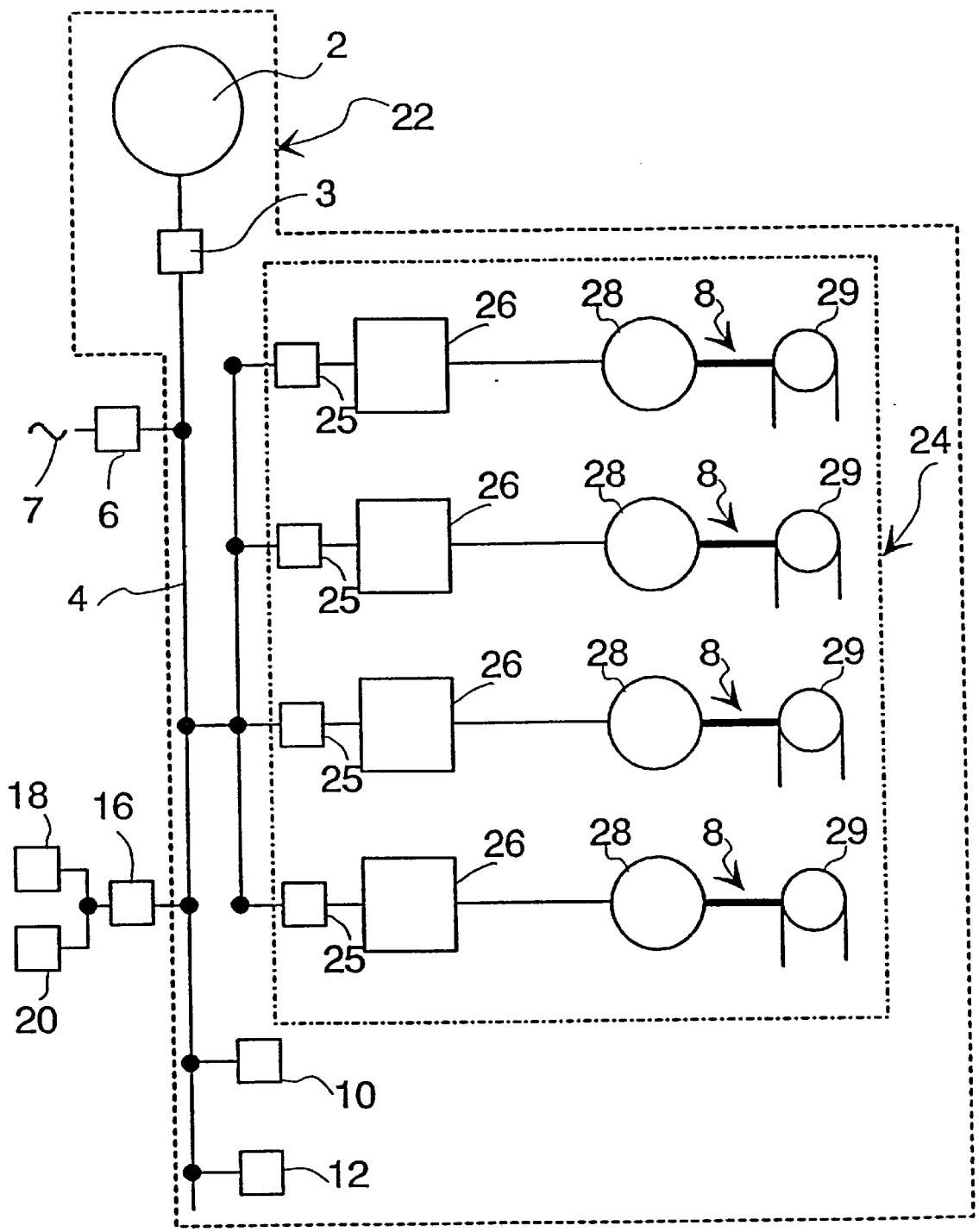
FIG. 2 presents a circuit diagram according to the invention.

FIG. 2 shows a diagram representing the principle of a reserve power supply system according to the invention, using the same reference numbering as in FIG. 1 where applicable. The reserve power generator 2 supplies the reserve power into the distribution network 4 of the building, which in an emergency is disconnected from the electricity supply network 7 by means of a switch 6. All the elevators 8 in the building, connected here as an elevator group 24, are connected via a switch 25 to the network 4 so that the motor 28 of each elevator 8, to which the traction sheave 29 is connected, is controlled by its own frequency converter 26 which, in a manner described in greater detail in connection with FIG. 3, converts the network frequency and voltage into a voltage and frequency feeding the elevator motor according to control. Other devices in the building are connected to the network as in FIG. 1.

The power rating of the reserve power generator is selected on substantially the same grounds as in conventional solutions and it is of the same magnitude. Therefore, the power reserved for the elevator system corresponds for each elevator group to the power needed by one elevator in normal operation. In the case illustrated by FIG. 2, the elevator group 24 comprises 4 elevators, and the power taken from the network 4 by the frequency converter 26 feeding each elevator is limited to one quarter of the nominal power. This limitation is achieved by restricting the rotational speed of the elevator motor in the heaviest operating conditions to one quarter of the nominal top speed, and in other load conditions the speed is correspondingly adjusted by a torque controlled frequency converter so that the power limit is not exceeded. The frequency converter and its speed regulator form a controller that adjusts the power to a value corresponding at its maximum to the power limit. In conformity with the interrelation between power, torque and velocity, reducing the torque allows the velocity to increase correspondingly. By adjusting the speed, the power consumed by the elevator drive is adjusted to the preset value. Because of the sizing of the counterweight and elevator car load and other elevator components forming a load on the elevator machinery, the highest power demand in the elevator drive occurs when the elevator is driving downwards with an empty car or when it is driving upwards with a full car. Correspondingly, the lowest power demand occurs in a situation where the elevator is driving downwards with a full load or upwards with an empty car. The load imposed on the elevator motor by the elevator car and counterweight is about zero when the car is half full. The exact values are determined individually in each elevator, which is why the exact power demands and ratings differ somewhat from the optimum situation, which is taken into account in practical design.

The simplest implementation is to distribute the reserve power available for elevator operation in equal proportions among all elevators in the group. In this case, sizing the reserve power for the elevators so that it corresponds to a quarter of the normal design power means for each elevator a quarter of its normal design power. However, this arrangement provides, especially in the event of evacuation caused by emergencies like a fire, a considerable advantage as compared to earlier systems and also a relatively large margin for adjustment between different elevators in an elevator group.

In the following, the operation of an individual elevator is described by the aid of the example given in FIG. 3. The hoisting motor 28 of the elevator is fed by a frequency converter 56, whose output voltage and frequency are adjusted to the values required by the elevator control system. The frequency converter is connected to the power supply via three-phase conductors 40 and to the motor 28 via three-phase conductors 41. The hoisting motor 28 moves the elevator car 30 and counterweight by means of a traction sheave 29 coupled to the motor shaft either directly or via a gear and hoisting ropes in a manner known in itself in elevator technology. The elevator control system for its part takes care of the movements of the car/cars in accordance with the calls given by passengers and the internal instructions within the elevator system. The implementations of these vary considerably depending on application and do not affect the action of the present invention. Each elevator has an individual nominal power, although the elevator group may of course consist of identical elevators of standard design.

The elevator load is measured by means of a load weighing device 32 mounted in the elevator car 30. Based on the weight data, the load is determined by unit 37 using the masses of the mechanics and components of the hoisting system of the elevator. The load data indicates the load torque applied to the shaft of the hoisting motor. The load torque depends on the masses of the counterweight, car and ropes as well as the suspension ratios of the ropes and the transmission ratios of the gears. In this embodiment, a maximum power $P_A$ allowed in an emergency power situation is determined for each elevator and the rotational speed is adjusted accordingly to a value corresponding to the load. The allowed output power value obtained from the power limiter 33 equals a quarter of the nominal power of the elevator when controlled as in the embodiment in FIG. 2. The allowed output power value can also be determined in other ways, as described in connection with FIG. 4. The signal determining the allowed power and the load data (conductor 36) obtained from unit 37 are input to a divider 34, which determines a reference speed $\omega_{ref}=P_A/T_L$ possible with the power available, where $T_L$ is the load data. The speed reference $\omega_{ref}$ determined by the divider 34 is passed via conductor 38 to the frequency converter 56, whose output is adjusted accordingly. Thus, the power taken by the frequency converter from the network remains within the assigned limits. If necessary, a tachometer 31 mounted on the motor shaft provides an actual speed value $\omega_{act}$, which is passed via conductor 39 to the frequency converter.

Figure 3:
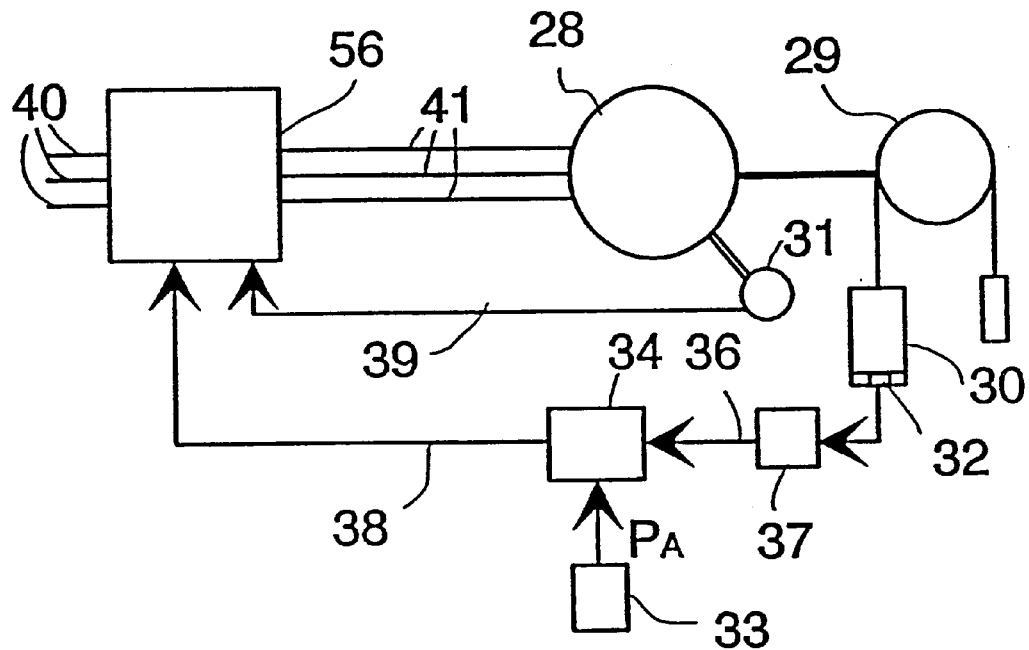
FIG. 3 presents a frequency converter according to the invention.

Although the power control as presented in FIG. 2 and 3 is based on separate control of the elevators, it allows a considerable improvement to be achieved in relation to earlier reserve power solutions with the same reserve power levels. All elevators in the elevator group or, if a limitation is for some reason desired, most of them can be used at the same time. Each elevator operates within the limits of its own power allotment. The power limit is preferably given as an elevator-specific parameter. At start-up, the allowed maximum torque correspondingly limits the acceleration. The speed and transport capacity of the elevator, i.e. the number or rather mass of passengers times the floor distance travelled per unit of time, is determined individually for each elevator. An elevator travelling with a full load in the down direction, which is the usual situation during evacuation, is advantageous in respect of power consumption as stated before and in fact generates power as the motor is working in generator mode. The motor can be run at full speed, which means that the transport capacity is at a maximum, i.e. the elevator is travelling with maximum load at full speed. The power thus generated must be consumed in some way, e.g. by a load resistance, or returned into the network. On the other hand, when the load is small, only a low speed is allowed in the down direction. In contrast, an empty car in the up direction or, as is often the case in an emergency, a car with one rescue worker in the up direction provides a similar advantage, as stated above.

Figure 4:
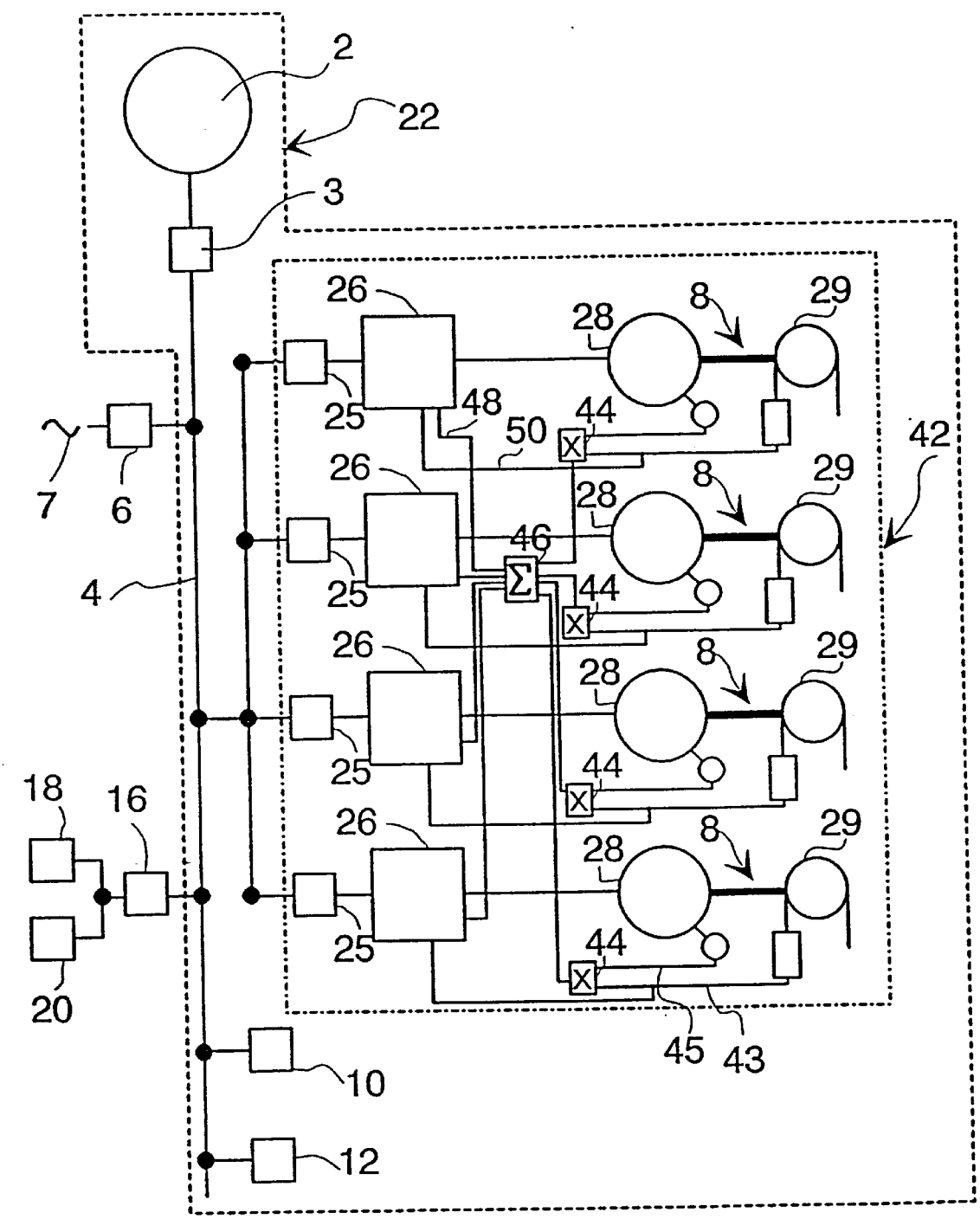
FIG. 4 presents another circuit diagram according to the invention.

FIG. 4 presents another embodiment of the invention. In this case the principle is that an overall power is defined that is shared by the elevators in a group or all elevators in the building in a reserve power situation. The momentary power available to each elevator in varying load conditions during operation is not limited except to the normal nominal design value, but the power for each elevator is adjusted to its highest possible value by a control system described below. The total power available to an elevator drive is limited to the same level of magnitude as in the conventional reserve power solution.

For each elevator group 42 or for all elevators in the building, a power calculator 44 monitoring the momentary load of the elevators is provided. The power calculator 44 is supplied with input data representing the actual values of the torque $T_{act}$ (via conductor 43) and speed $\omega_{act}$ (via conductor 45) of the elevator, and these actual values are used to determine the momentary power consumption or possibly, depending on the operational condition, the power generated by the elevator. The output of the power calculator 44 is taken to a regulator 46 which determines the total power $P_\Sigma$ of the elevator group. Based on the total power and the power of each elevator, a power limit is defined for each elevator. The power available in a reserve power situation is defined individually for each elevator in accordance with the load conditions. This power may even be of the same order of magnitude as the nominal power. In fact, the only condition is that the power taken by the elevator group or elevator drives from the network must not exceed the allotted share of the reserve power. The regulator output provides the elevator-specific power limits $P_A$, which are passed via conductors 48 to the frequency converters 26 of each elevator. The frequency converters generate a speed reference based on the power limit and the load data supplied via conductor 50 as depicted in FIG. 3.

In the solution illustrated by FIG. 4, the basic situation regarding power regulation is that all the elevators consume the same proportion of their nominal power as the design reserve power for the elevator drives is of the nominal power of the elevator drives. The total power consumption is monitored continuously and when it falls below the total power reserved for the elevator drives, a check is performed to see which elevators are consuming power, i.e. moving in such a direction and having a torque in such a direction that they must take power from the network. For these elevators, the allowed power limit is raised and accordingly their speed reference is increased accordingly. The power limit is raised in the same proportion for all loaded elevators or the elevators are priorized in a selected manner. A possible basis for priorization is the load situation, in other words, an elevator carrying more passengers is run faster. The regulation of the elevators in a group in accordance with the power limit is incorporated in the elevator group control system.

In this respect, the group control system may function as follows. A check is performed to see if the total power of the elevators exceeds a selected power limit. The system determines which ones of the elevators are generating and which ones are consuming power. It determines the elevators for which a power increase is desirable with the set criteria. The power limit for these elevators is raised in accordance with the protocol. In this application, a considerable portion of the power generated by the elevators is used to drive other elevators. However, the frequency converters also contain a power consuming element, e.g. a resistor in the d.c. circuit, or they control the motor in such a way that the power consumed exceeds the value set by the torque and speed references.

Figure 5:
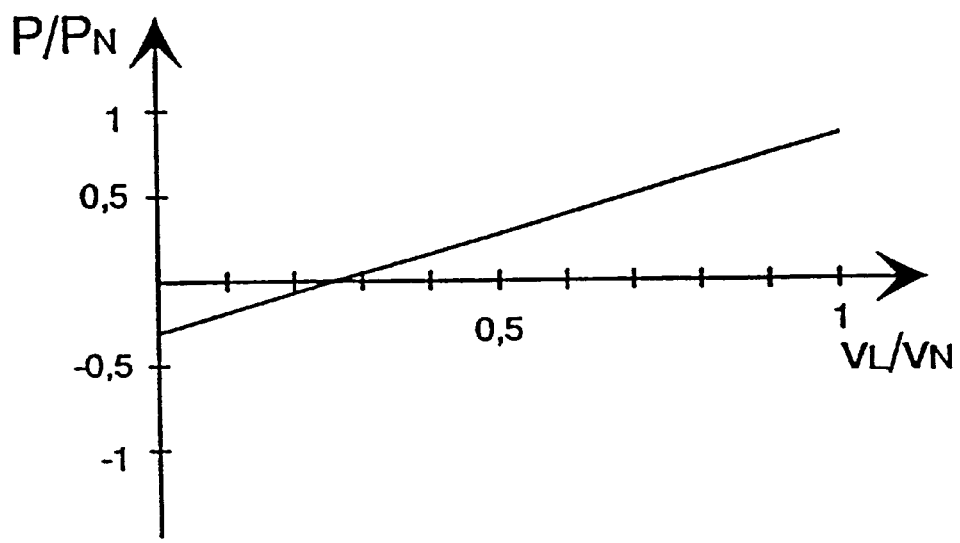
FIG. 5 presents the power/velocity interrelation of the drive.

When the motor is operated as a generator, the power distribution can be expressed by the formula $P_m=P_e+P_1$, where $P_m$=mechanical power on the motor shaft, $P_e$=electric power generated and $P_1$=power dissipation, corresponding in magnitude to about 15 . . . 25% of the nominal power. When the frequency converter is controlled by a changeable output frequency, i.e. when the rotational speed of the motor is changing, the power fed by the frequency converter into the network increases as a function of rotational speed in the manner presented in FIG. 5. When the speed equals the nominal speed $V=V_n$, the electric power fed into the network is lower than the nominal power $P_N$ by an amount corresponding to the dissipation, i.e. about 75 . . . 85% of the nominal power. Correspondingly, at zero speed the motor needs power for control and dissipation and takes an amount of power corresponding to 15 . . . 25% of its nominal power from the network even though it is working in generator mode. At a speed of about $v_1=0.15 \ldots 0.25*v_N$, no power is flowing from or into the network. Of the elevators operated in generator mode, the ones that are running at a speed above the speed limit $v_L$ are generating energy for consumption by other elevators. The other elevators, the ones whose speed is below $v_L$, operated in generator or motor mode, are consuming energy.

If during operation there occurs a situation where more power is generated than can be consumed by the devices in the building, it is possible to operate the elevator motor at zero speed under control of the frequency converter. In this case, the motor consumes an amount of power corresponding to its dissipation and magnetization, as can be seen from FIG. 5. Correspondingly, the elevators generating power can be driven at a speed below the nominal speed, in which case the power they generate is reduced as compared with the nominal power.

In the solution of FIG. 4 described above, other equipment in the building that uses reserve generator power is substantially in the same operational situation and is guaranteed the same reserve power as in conventional reserve power solutions. If the elevator drives are allowed to supply energy into the network, the power available to other power consuming equipment increases correspondingly.

When the reserve power system is in operation, the total net power generated by the elevators is monitored and used to feed devices outside the normal reserve power system. The reserve power network is provided with power measuring devices that continuously measure the power available in the network. When the network power exceeds a preset power limit, in addition to the normal devices included in reserve power operation, other devices are turned on, such as lights. The power required by these is obtained from the energy generated by the elevators. In principle, all energy developed by the elevator drives is supplied to other devices. A limitation can be still found in the fact that the elevators receive the power designed for them depending on the operational situation of the elevator and other loads, which limitation is consistent with the examples described above.

On the other hand, in evacuation use of the elevators, the situation is advantageous all the time because the elevators generate net energy as they keep driving down with full load and up with no load.

In the embodiment in FIG. 4, upon starting of the reserve power generator, the elevator control devices are turned on first. The elevator control system determines which one of the elevators in the building or elevator group is in a position to generate energy for other equipment and other elevators. As the production of energy increases, other elevators are started at intervals depending on their starting time constants.

The amount of reserve power generated by the elevators falls dramatically after the evacuation operation. Since in this situation the elevator capacity needed is substantially reduced, the elevators' share of power can also be reduced for the benefit of other equipment. In the event of a change in reserve power, e.g. a fall in momentary power, it is possible to change the power limits for the elevators, in which case the allowed speeds are changed accordingly. As long as the changes are small, the passengers will not necessarily even react to them or find the situation uncomfortable.

In the above, the invention has been described by the aid of some of its embodiments. However, the examples are not to be regarded as limiting the sphere of patent protection, but the embodiments of the invention can be varied within the limits defined by the following claims.

We claim:

1. Reserve power system comprising:
   a reserve power machine for the generation of reserve power;
   a plurality of elevator drives each including an elevator hoisting motor controlled by a frequency converter; and
   a distribution network connecting said reserve power machine and elevator drives, wherein at least one elevator drive is provided with a regulating device for adjusting the speed of the elevator motor so that power taken by the at least one elevator drive from the distribution network is lower than an adjustable power limit representing a share of the reserve power allocated to the at least one elevator drive.

2. System according to claim 1, wherein at least two elevators are combined into a group and speeds of said elevators are adjustable so that power taken by the group from the distribution network is lower than the adjustable power limit.

3. System according to claim 2, wherein at least one elevator drive can be controlled so that it will generate power for supply to other elevator drives in the same group.

4. System according to claim 1, wherein at least one elevator drive can be controlled so that it will generate power for supply to other elevator drives.

5. System according to claim 1, wherein the power limit for each elevator drive can be adjusted separately.

6. System according to claim 1, wherein each elevator drive is provided with power monitoring devices used to determine the power requirement of each corresponding elevator and with power limit defining devices used to define the power limit, on the basis of which speed of the elevator is determined.

7. System according to claim 1, wherein elevator-specific power limits within an elevator group can be defined by a group controller.

8. System according to claim 1, wherein the power limit can be determined by means of an elevator-specific parameter.

9. System according to claim 1, wherein the system comprises equipment used to determine the starting order of the elevator drives in accordance with power generating capability of each corresponding elevator.

* * * * *